United States Patent [19]

Lynch

[11] 4,108,478
[45] Aug. 22, 1978

[54] MEANS TO PREVENT RELATIVE ROTATION OF THREADED TOGETHER PIN AND BOX TOOL JOINTS

[75] Inventor: Paul E. Lynch, Broken Arrow, Okla.

[73] Assignee: Fenix & Scisson, Inc., Tulsa, Okla.

[21] Appl. No.: 812,475

[22] Filed: Jul. 5, 1977

[51] Int. Cl.² ............................................. F16L 55/00
[52] U.S. Cl. .................................... 285/82; 285/333; 285/421; 403/320; 403/341
[58] Field of Search .................. 285/81, 82, 84, 85, 285/86, 333, 334, 306, 317, 421, DIG. 21, 312, 314, 309, 177; 403/320, 341, 286, 343, 303; 188/67, 43

[56] References Cited

U.S. PATENT DOCUMENTS

| 17,236 | 5/1857 | Sellers | 403/303 |
|---|---|---|---|
| 320,439 | 6/1885 | Mackintosh | 403/303 |
| 503,033 | 8/1893 | Boorman | 403/303 |
| 1,872,105 | 8/1932 | Black | 188/67 |
| 2,017,994 | 10/1935 | Spang | 285/306 X |
| 3,096,075 | 7/1963 | Brown | 188/67 X |
| 3,866,954 | 2/1975 | Slator et al | 285/82 |

Primary Examiner—Werner H. Schroeder
Assistant Examiner—Carl J. Arbes

Attorney, Agent, or Firm—Head, Johnson & Chafin

[57] ABSTRACT

In a rotary drilling system for drilling deep, large-diameter bore holes in the earth, using multiple lengths of drill pipe joined together by threaded tool joints, the improvement in means to prevent relative rotation while joining and unjoining the two parts of the threaded-together tool joints, after the tool joints has been made to a desired torque, comprises a retaining cylinder or ring, of somewhat larger diameter than the diameter of the tool joints, positioned to surround a tool joint with an annular space of a selected radial dimension. There is at least one pair of longitudinally slidable cams or wedges that slide within longitudinal grooves on the inside surface of the retainer ring. Hydraulic means are provided to move the pair of wedges longitudinally toward each other, along the sloping grooves until they are wedged between the retaining ring and the outer surface of the tool joint, one wedge opposite each part of the tool joint. Sufficient force is applied to the ends of the wedges to generate sufficient pressure between the inner surfaces of the wedges, and the outer surfaces of the tool joints parts, so that once the wedges are set, a much greater torque is required to turn the tool joint parts with respect to each other.

8 Claims, 3 Drawing Figures

MEANS TO PREVENT RELATIVE ROTATION OF THREADED TOGETHER PIN AND BOX TOOL JOINTS

BACKGROUND OF THE INVENTION

1. Field of the Invention

This invention lies in the field of the drilling of large-diameter, deep boreholes by the rotary method.

More particularly this invention concerns means for overcoming the troubles normally exhibited when very large diameter bits and drill collars are supported on large-diameter drill pipe, whereby there may be a tendency for the tool joints to tighten to the point where they cannot be broken, or conversely, to loosen to the point where they separate; or, allows for transmission of torque through a tool joint without requiring full make-up of a given tool joint.

This invention involves apparatus for attachment to the tool joints whereby hydraulic pressure is provided to wedges which are retained between a cylindrical retainer ring, and the outer surfaces of the tool joint parts, so that independent relative motion of one part of the tool joint with respect to the other is prevented.

2. Description of the Prior Art

In the drilling of large diameter boreholes, which might be in the neighborhood of 10 to 20 feet or more in diameter, relatively large diameter drill pipe is required which may be of the order of 12 to 20 inches in diameter. Large torques are required to make up the tool joints to the proper torque.

In operation, because of the great mass of the bit assembly and of the drill collars, required to provide a pressure of the bits against the rock, and because of the resistance of the bit, the rotation may tighten the tool joints so that they lock, and it becomes impossible to separate them.

SUMMARY OF THE INVENTION

It is a primary object of this invention to provide an apparatus that can be attached to the drill pipe, whereby wedging means are provided to lock each of the two halves of a tool joint, that is, the box and pin portions, to a locking ring surrounding the tool joint, so that the wedging force is sufficient to prevent the relative rotation of one part of the tool joint with respect to the other, even under the highest torque available from the rotary table.

These and other objects are realized and the limitations of the prior art are overcome in this invention by providing a cylindrical retaining ring which coaxially surrounds the tool joint. The inside surface of the retaining ring is formed with conical shaped surfaces tapering toward the center from the top and bottom ends of the retaining ring. Longitudinal grooves are cut in these surfaces to guide wedges or cams, which can slide longitudinally in the grooves and be forced by hydraulic means to move toward the center, where they wedge between the grooves in the retaining ring and the cylindrical surface of the tool joint. Because of the small angle of the wedges, with a selected hydraulic force longitudinally applied, tremendous radial forces can be exerted between the inner surfaces of the wedges and the outer surfaces of the tool joints, with one wedge in contact with each half. Thus each part of the tool joint is locked to the retaining ring, and they cannot turn with respect to each other. When the hydraulic force is removed, springs are provided to move the wedges outwardly so as to release the radial force inward on the outer surface of the tool joint. Various means are shown for exerting the hydraulic force on the wedges.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Figure 1:
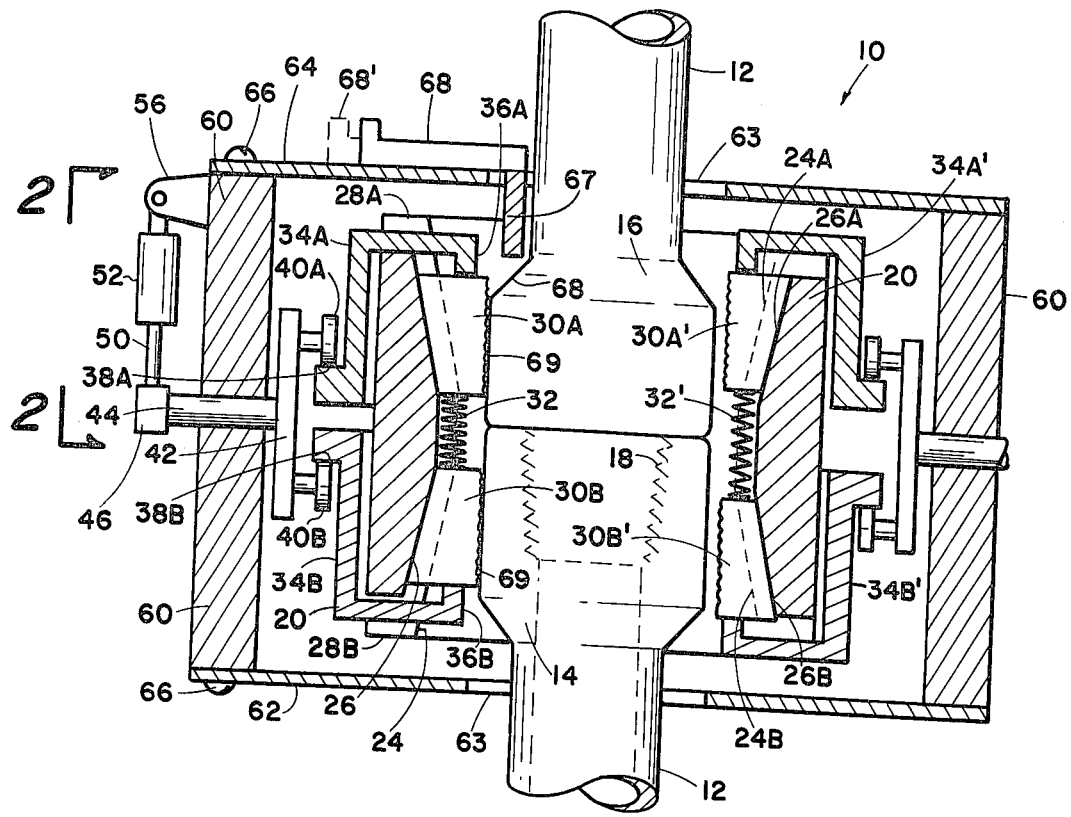
FIG. 1 represents in cross-section one embodiment of this invention.

Referring now to the drawings and in particular to FIG. 1, there is shown one embodiment of the apparatus illustrated generally by the numeral 10. A portion of the drill pipe 12 including one tool joint, having a pin portion 16 and a box portion 14 are shown threaded together. Surrounding the tool joint is a cylindrical retaining ring 20 which comprises a relatively thick cylindrical ring concentric with, and spaced radially from the tool joint walls.

The inside surface of the retaining ring 20 comprises two conical portions 24A at one end, and 24B at the other end, where the conical angle is a selected small angle. There are one, or a plurality of longitudinal grooves on the inner surface of the retaining ring 20. The bases of the grooves are indicated by the numerals 26A and 26B corresponding to the surfaces 24A and 24B. The grooves are preferably of a constant radial depth. In each of the grooves 26, there are a pair of cams or wedges, 30A and 30B, adapted to slide longitudinally in the grooves 26. A spring 32 is provided against which the wedges press as they are moved inwardly from the top and bottom ends of the retaining ring. A pair of arms 36A and 36B are adapted to press on the outer ends of the wedges. These arms have additional wings 34A, 34B, and 38A and 38B, for example, whereby rollers 40A and 40B, supported on a rod 42 and journalled on a shaft 44, can be rotated to compress the two portions 38A and 38B, thus pressing down on the wedges 30A and 30B by means of the portions of the arms 36A and 36B, for example. The pressure applied by the rollers forces the arms to slide in grooves 28A and 28B respectively as they press on the wedges 30A and 30B against the force of the spring 32, until the wedges are exerting a very large radial force inwardly on the pin and box portions of the tool joint.

Figure 2:
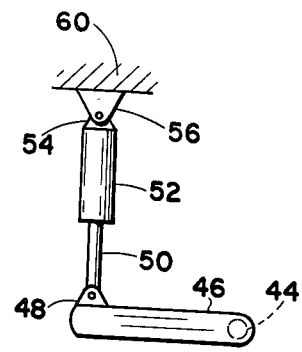
FIG. 2 illustrates a portion of the apparatus as seen in the plane 2—2 of FIG. 1.

As shown in FIG. 1, there may be an additional cylindrical pipe 60, or housing, surrounding the apparatus associated with the retaining ring. The shafts 44 can be passed through this wall of the housing 60, and as shown in FIG. 2, with an arm 46 attached to the shaft 44, with a hydraulic cylinder 52 and piston rod 50 attached respectively to an ear 56 attached to the outside surface of the housing and another ear 48 attached to the end of the arm 46. Hydraulic force can be applied to rotate the arms 46 and 42 to force the two arms 36A and 36B together, exerting a selected pressure on the wedges 30 sufficient to bind the tool joint portions, and prevent their relative turning with respect to one another.

While no means has been shown for carrying the pressurized liquid to operate the cylinder 52, for example, it could be conventional, in the form of a hose capable of withstanding the hydraulic pressure. The manner of applying the hydraulic liquid to the cylinder forms no part of this invention and can be conventional.

The housing includes the cylindrical tube 60 and top and bottom plates 64 and 62 respectively, which are attached by conventional means 66 to the cylindrical tube 60. There should be a clearance opening 63 at the centers of the plates 62 and 64, such that the device can be slipped over the tool joint and added to or removed from the drill stem as required.

There is a device 68, partially illustrated schematically in FIG. 1, which has a radial arm and a semi-cylindrical downward projection 67, such that when the arm 68 is pushed inwardly (as shown), the cylindrical portion 67 will rest against the sloping portion 68 of the pin portion of the tool joint. The entire device 10, illustrated in FIG. 1 will thus hang on the top of the tool joint and be in the proper operating position, so that the cams can be pressed together, to lock the device to the tool joint. The dashed outline 68' show the retracted position of the device 68 so that when it is retracted the cylindrical portion 67 will be outside of, and would clear the outer surface 69 of the tool joints.

In FIG. 1, the cams 30A, 30B and spring 32 are illustrated in the compressed condition of the wedges, while on the opposite side of the tool joint, the wedges 30A and 30B show the relaxed, or separated position of the cams or wedges, which corresponds to their position when the device is being moved into position to be attached to a tool joint.

Figure 3:
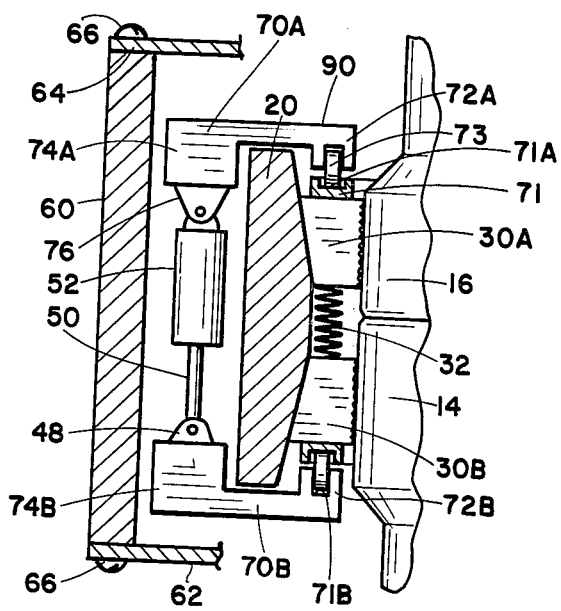
FIG. 3 shows an alternate embodiment of portions of the apparatus of FIG. 1.

Referring now to FIG. 3 there is illustrated a variation of the embodiment of FIG. 1, which may simplify the construction somewhat. In FIG. 3, the housing 60 and the top and bottom plate 64 and 62 respectively are still provided but the hydraulic cylinder 52 and piston rod 50 are attached directly to the arms 70A and 70B, which directly press at their outer ends 72A and 72B respectively onto a floating ring 71 which is positioned on top of wedges 30A an 30B. In this case, the entire operating mechanism comprising the hydraulic cylinder 52, piston rod 50 and arms 70A and 70B are completely enclosed within the outer surface of the housing cylinder 60, which provides protection for the operating mechanism.

While the return mechanism for separating the wedges is shown to be the spring 32, it is realized that it may not be advisable to use the spring, if as is likely to be the case, very large longitudinal forces are necessarily applied to the cams. In such a case, it may be desirable to use a double acting hydraulic cylinder 52, and to use two hoses, conduits or pipes of hydraulic fluid, a high pressure fluid in one pipe, and a lower pressure fluid in the other pipe, with means to switch the high and low pressure fluids between the two pipes depending on whether the tool joints are to be locked or to be unlocked. In this way a very substantial hydraulic force can be applied to move the wedges outwardly to release the tool joint. This force can be as large as the compressive force that placed them in position in the first place.

While FIG. 1 illustrates at least two grooves on the inner surface on the retaining ring, with two sets of wedges, it is clear that any desired number of pairs of wedges can be used, from one up to three or more pairs of wedges.

In review, the invention comprises apparatus for locking the two halves of a tool joint, by means of wedges, adapted to move in longitudinal grooves on the inside surface of a retaining ring, which surrounds the tool joints. The grooves follow a pair of conical surfaces, which taper from top and bottom surfaces of the retaining ring, toward the middle. Wedges inserted into the grooves, and pressed inwardly from top and bottom, will move radially inwardly toward the surfaces of the tool joints, and will wedge the surfaces of the tool joints to the groove, and to the retaining ring. This will prevent relative rotation of the two halves of the tool joint.

In its simplest form the invention involves a retaining ring of the shape just described, at least one set of grooves with one pair of wedges, and hydraulic fluid means for forcing the two wedges inwardly toward the center of the retaining ring, whereby the retaining ring is wedged tightly to the outer surfaces of the two halves of the tool joint, preventing them from relatively turning one with respect to the other.

It will be clear that it is possible to provide a selected texture, such as longitudinal shallow grooves or flutes, in the tool joints, and corresponding texture in the surfaces of the cams, as desired, to increase the resistance to rotation of the tool joints with respect to the wedges and so on.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. In a rotary drilling system for drilling large-diameter boreholes, in the earth, and using multiple lengths of drill pipes, joined by threaded tool joints, the improvement in means to prevent relative rotation of threaded-together pin and box tool joints, after the tool joint has been made up to the proper torque, comprising:
   (a) cylindrical retainer means positioned to surround a tool joint with an annular space between said tool joint and said retainer means;
   (b) at least one pair of longitudinally slidable wedge or cam means on the inside surface of said retainer means;
   (c) hydraulic means to move said at least one pair of wedge or cam means longitudinally toward each other, along sloping grooves in said inside surface of said retainer means;

whereby as said cam means move toward each other, they move radially inwardly and press on the outer surfaces of said pin and box parts of said tool joints with a selected pressure;

whereby said pressure of said cam means on said tool joints prevents relative rotation of said parts of said tool joint.

2. The apparatus as in claim 1 in which said retainer comprises:
   (a) a cylindrical metal tube having an outside cylindrical surface, and of selected length;
   (b) an inside surface comprising two conical surfaces tapering from each end towards the middle;

dyne styrene or a high detensity polyethylene or the like. These five parts are molded separately and at the end of the manufacturing process are assembled by inserting the prong 60 in the lower end of the support member 14. Assembly is completed by positioning the support member 14 relative to the seat 12 so that the pins 44 may be pressed into openings in the walls 26 of the socket means so the inner ends of the pins are disposed in the groves 34.

A portable seat has been provided in which all of the components can be made of the same plastic material and in which a seat portion may be folded relative to a support portion and can be moved to selected positions longitudinally of the support and parallel thereto for the purpose of transporting the folded seat member. In the folded condition, all of the components remain attached to each other and the assembly incorporates a hanger which can be used to suspend the collapsed seat from a belt or the like of a person or from a golf bag, for example. The lower end of the support member is provided with a stop member which prevents undue penetration into soft ground and also with a prong member which serves to pierce the ground and maintain the seat in the vertical position when it is not occupied. The prong may be removed for use of the seat assembly on hard surfaces such as those encountered indoors.

The embodiments of the invention in which an exclusive property or privilege is claimed are defined as follows:

1. A portable seat comprising; a seat member, support member for supporting said seat member in an elevated position above the ground, a socket means formed at the underside of said seat member for receiving the upper end of said support member to hold said members in a fixed relative position for use, pivot means associated with said seat member, guide means associated with said support member and receiving said pivot means to permit sliding movement of said pivot means relative to said support during displacement of said support from said socket means to a folding position, said support member being pivotal relative to said seat member from said folding position to a folded position wherein said support member and seat member are disposed generally parallel to each other, said seat member being slidable from said folded position longitudinally of said support member to selected storage positions with said pivot means movable to positions between the opposite ends of said support member, latch means associated with said seat member and support member to limit said sliding movement of said seat and support members relative to each other and maintain said members in said selected storage positions.

2. The combination of claim 1 in which said seat member, support member, socket means, pivot means, guide means, and means limiting sliding movement are all made of plastic material.

3. The combination of claim 1 in which said seat member is formed with openings forming handholds at opposite sides of said seat.

4. A portable seat comprising; a seat member, a support member for supporting said seat member in an elevated position above the ground, a socket means formed at the underside of said seat member for receiving the upper end of said support member to hold said members in a relative position for use, pivot means associated with said seat member, guide means associated with said support member and receiving said pivot means to permit sliding movement relative thereto during displacement of said support from said socket means to a folding position, said support member being pivotal relative to said seat member from said folding position to a folded position wherein said support member and seat member are disposed generally parallel to each other, said seat member being slidable from said folded position longitudinally of said support member to a selected storage position, means associated with said seat member and support member to limit sliding movement of said seat and support members relative to each other and maintain said members in said storage position, said seat member being formed with openings forming handholds at opposite sides of said seat, and wherein said means limiting sliding movement includes a stop member on said support member, said stop member being disposed in a selected one of said handholds.

5. The combination of claim 5 in which said stop member is a plate member extending transversely adjacent one end of said support member.

6. The combination of claim 1 wherein said support member has a plate member extending transversely of and adjacent one end of said support member, said plate member having a concave ground engaging portion.

7. A portable seat comprising; a seat member, a support member for supporting said seat member in an elevated position above the ground, a socket means formed at the underside of said seat member for receiving the upper end of said support member to hold said members in a relative position for use, pivot means associated with said seat member, guide means associated with said support member and receiving said pivot means to permit sliding movement relative thereto during displacement of said support from said socket means to a folding position, said support member being pivotal relative to said seat member from said folding position to a folded position wherein said support member and seat member are disposed generally parallel to each other, said seat member being slidable from said folded position longitudinally of said support member to a selected storage position, means associated with said seat member and support member to limit sliding movement of said seat and support members relative to each other and maintain said members in said storage position, said support member having a plate member extending transversely of and adjacent one end of said support member, said plate member having a concave ground engaging portion, and wherein said seat member is formed with an opening adjacent one side and said plate member is disposable in said opening to form said means limiting sliding movement of said seat and support members.

8. The combination of claim 1 wherein said means limiting movement includes a latch on said seat member detachable engagable with selected portions extending longitudinally of said support member to maintain the latter and the seat member parallel to each other.

9. A portable seat comprising; a seat member, a support member for supporting said seat member in an elevated position above the ground, a socket means formed at the underside of said seat member for receiving the upper end of said support member to hold said members in a relative position for use, pivot means associated with said seat member, guide means associated with said support member and receiving said pivot means to permit sliding movement relative thereto during displacement of said support from said socet means to a folding position, said support member being pivotal relative to said seat member from said folding position to a folded position wherein said support member and seat member are disposed generally parallel to each other, said seat member being slidable from said folded position longitudinally of said support member to a selected storage position, means associated with said seat member and support member to limit sliding movement of said seat and support members relative to each other and maintain said members in said storage position, said means limiting movement including a latch on said seat member detachably engagable with selected portions of said support member extending longitudinally to maintain the latter and said seat member parallel to each other, and wherein said support member is formed with a plurality of uniformly spaced stops extending longitudinally of said support member, adjacent pairs of said stops forming said selected portions.

10. The combination of claim 1 in which said support member mounts a prong at an end opposite to said socket receiving portion for piercing the ground.

11. The combination of claim 10 in which said prong is detachable supported at one end of said support member for removable when said seat is used on a hard surface.

12. The combination of claim 11 in which said prong includes a detent normally biased to a latching position.

13. The combination of claim 12 in which said prong and detent are made of a single piece and of the same material as said seat and support members.

14. The combination of claim 1 in which said support member is elongated and said guide means extend substantially the full length of said support member.

15. The combinations of claim 1 and further comprising bracket means on said support member adjacent to said socket receiving portion of said support member, said bracket means being adapted to receive a belt or the lie to support said seat from a user for transport purposes.

16. The combination of claim 1 wherein said latch means comprises a latch attached to said seat and spaced from said pivot means and in which said support means is movable to a latch engaging position by pivotal movement relative to said seat member.

17. A portable seat comprising; a seat member, a support member for supporting said seat member in an elevated position above the ground, a socket means formed at the underside of said seat memer for receiving the upper end of said support member to hold said members in a reltive position for use, pivot means associated with said seat member, guide means associated with said support member and receiving said pivot means to permit sliding movement relative thereto during displacement of said support from said socket means to a folding position, said support member being pivotal relative to said seat member from said folding position to a folded position wherein said support member and seat member are disposed generally parallel to each other, said seat member being slidable from said folded position longitudinally of said support member to a selected storage position, means associated with said seat member and support member to limit sliding movement of said seat and support members relative to each other and maintain said members in said storage position, said support member mounting a prong at an end opposite to said socket receiving portion for piercing the ground, said prong being detachably supported at one end of said support member for removal when said seat is used on a hard surface, said prong includes a detent normally biased to a latching position, and release means formed integrally with said support member and engagable with said detent for deflecting the latter from said latching position to an unlatching position.

* * * * *